(12) United States Patent
Higaki et al.

(10) Patent No.: US 7,705,872 B2
(45) Date of Patent: Apr. 27, 2010

(54) OPTICAL WRITING DEVICE AND IMAGE FORMING APPARATUS

(75) Inventors: Hideto Higaki, Kanagawa (JP);
Kazunori Bannai, Kanagawa (JP);
Noboru Kusunose, Kanagawa (JP);
Yoshinobu Sakaue, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 35 days.

(21) Appl. No.: 12/230,508

(22) Filed: Aug. 29, 2008

(65) Prior Publication Data
US 2009/0058981 A1   Mar. 5, 2009

(30) Foreign Application Priority Data
Sep. 4, 2007   (JP) ............... 2007-228786

(51) Int. Cl.
*B41J 2/44*   (2006.01)
*G02B 26/10*   (2006.01)

(52) U.S. Cl. ....................... 347/243; 347/244
(58) Field of Classification Search ............ 347/233, 347/241, 243, 244
See application file for complete search history.

(56) References Cited

U.S. PATENT DOCUMENTS

| | | | |
|---|---|---|---|
| 5,055,860 A | | 10/1991 | Bannai |
| 5,068,677 A | * | 11/1991 | Matsuura et al. ............ 347/241 |
| 5,315,322 A | | 5/1994 | Bannai |
| 6,697,092 B2 | | 2/2004 | Bannai |
| 6,873,346 B2 | | 3/2005 | Bannai |
| 6,891,559 B1 | | 5/2005 | Bannai |
| 7,215,349 B2 | | 5/2007 | Sakaue et al. |
| 2004/0100550 A1 | | 5/2004 | Bannai et al. |
| 2006/0055769 A1 | | 3/2006 | Yamazaki et al. |
| 2007/0053040 A1 | | 3/2007 | Sakaue et al. |
| 2007/0064087 A1 | | 3/2007 | Matsumae et al. |
| 2007/0153079 A1 | | 7/2007 | Sakaue et al. |
| 2007/0188589 A1 | | 8/2007 | Kusunose et al. |
| 2008/0024851 A1 | | 1/2008 | Sakaue et al. |

FOREIGN PATENT DOCUMENTS

| | | | |
|---|---|---|---|
| JP | 60-032019 | * | 2/1985 |
| JP | 02-083516 | | 3/1990 |
| JP | 03-200114 | | 9/1991 |
| JP | 04-074688 | | 3/1992 |
| JP | 04-101501 | | 3/1992 |
| JP | 06-164847 | | 6/1994 |
| JP | 07-084200 | | 3/1995 |
| JP | 09-127444 | | 5/1997 |
| JP | 10-003048 | | 1/1998 |
| JP | 10-282440 | | 10/1998 |
| JP | 3084829 | | 7/2000 |
| JP | 2002-287057 | | 10/2002 |
| JP | 2004-279657 | | 10/2004 |
| JP | 2005-153347 | | 6/2005 |

OTHER PUBLICATIONS

English Abstract for JP 05-080264 published Apr. 2, 1993.

* cited by examiner

*Primary Examiner*—Huan H Tran
(74) *Attorney, Agent, or Firm*—Harness, Dickey & Pierce, P.L.C.

(57) ABSTRACT

An optical writing device includes a dichroic mirror and a deflection beam splitter. The dichroic mirror causes a light beam to pass therethrough or reflect depending on the wavelengths of the light beam. The deflection beam splitter causes a light beam to pass therethrough or reflect depending on a direction from which the light beam is received.

20 Claims, 8 Drawing Sheets ered mirrors 59. Because the
OPTICAL WRITING DEVICE AND IMAGE FORMING APPARATUS

CROSS-REFERENCE TO RELATED APPLICATIONS

The present application claims priority to and incorporates by reference the entire contents of Japanese priority document 2007-228786 filed in Japan on Sep. 4, 2007.

BACKGROUND OF THE INVENTION

1. Field of the Invention

The present invention relates to an optical writing device used in an image forming apparatus.

2. Description of the Related Art

There has been an increasing demand to reduce size, weight, and cost of image forming apparatuses. Color image forming apparatuses are generally larger than monochrome image forming apparatuses because the color image forming apparatuses need a lot more components than the monochrome image forming apparatuses. Therefore, there has been an increasing demand to downsize that color image forming apparatuses.

Optical writing devices (optical scanning devices) are used in image forming apparatuses. In the commercially available optical writing devices, numerous reflecting mirrors are used to reflect light beams to scan the scan targets. Because numerous mirrors are used, the optical writing device tends to be thick.

FIG. 16 is a schematic diagram of a conventional optical writing device. In this optical writing device, light beams emitted from light sources (not shown) are deflected by a polygon mirror 54, and are directed onto photosensitive elements 101 via a number of reflecting mirrors 59. Because the reflecting mirrors 59 need to be spaced apart to avoid interferences of the light beams, spacing is inevitably increased, thereby increasing the size, particularly in the up-down direction.

Japanese Patent Application Laid-open No. H4-74688 discloses an optical system for a two-color laser printer, in which a polarizing beam splitter is used to split one light beam into two sub-light beams and radiate each of the sub-light beams onto a different position on one photosensitive element.

However, Japanese Patent Application Laid-open No. H4-74688 does not disclose a technology for reducing the width of the optical writing device.

SUMMARY OF THE INVENTION

It is an object of the present invention to at least partially solve the problems in the conventional technology.

According to an aspect of the present invention, there is provided an optical writing device that scans a plurality of scan target surfaces with a plurality of light beams. The optical writing device includes a plurality of light sources that emits light beams of different wavelengths; an optical element that focuses the light beams into focused light beams to have one optic axis in a sub scanning direction; a deflector that deflects the focused light beams to obtain deflected light beams; a first beam separation unit that passes therethrough or reflects a light beam depending on a direction from which the light beam is received, wherein the first beam separation unit passes the deflected light beams as passing beams; and a second beam separation unit that passes therethrough or reflects a light beam depending upon a wavelength of the light beam, wherein the second beam separation unit separates the passing beams into a first passing beam that passes through the second beam separation unit and a first reflecting beam that is reflected from the second beam separation unit. The first reflecting beam is directed toward the first beam separation unit where the first reflecting beam is reflected as a reflecting beam, a first one of the scan target surfaces is scanned with the reflecting beam, and a second one of the scan target surfaces is scanned with the first passing beam.

According to another aspect of the present invention, there is provided an image forming apparatus that includes an optical writing device that scans a plurality of scan target surfaces with a plurality of light beams, the optical writing device including a plurality of light sources that emits light beams of different wavelengths; an optical element that focuses the light beams into focused light beams to have one optic axis in a sub scanning direction; a deflector that deflects the focused light beams to obtain deflected light beams; a first beam separation unit that passes therethrough or reflects a light beam depending on a direction from which the light beam is received, wherein the first beam separation unit passes the deflected light beams as passing beams; and a second beam separation unit that passes therethrough or reflects a light beam depending upon a wavelength of the light beam, wherein the second beam separation unit separates the passing beams into a first passing beam that passes through the second beam separation unit and a first reflecting beam that is reflected from the second beam separation unit. The first reflecting beam is directed toward the first beam separation unit where the first reflecting beam is reflected as a reflecting beam, a first one of the scan target surfaces is scanned with the reflecting beam, and a second one of the scan target surfaces is scanned with the first passing beam.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained below in detail with reference to the accompanying drawings.

Figure 1:
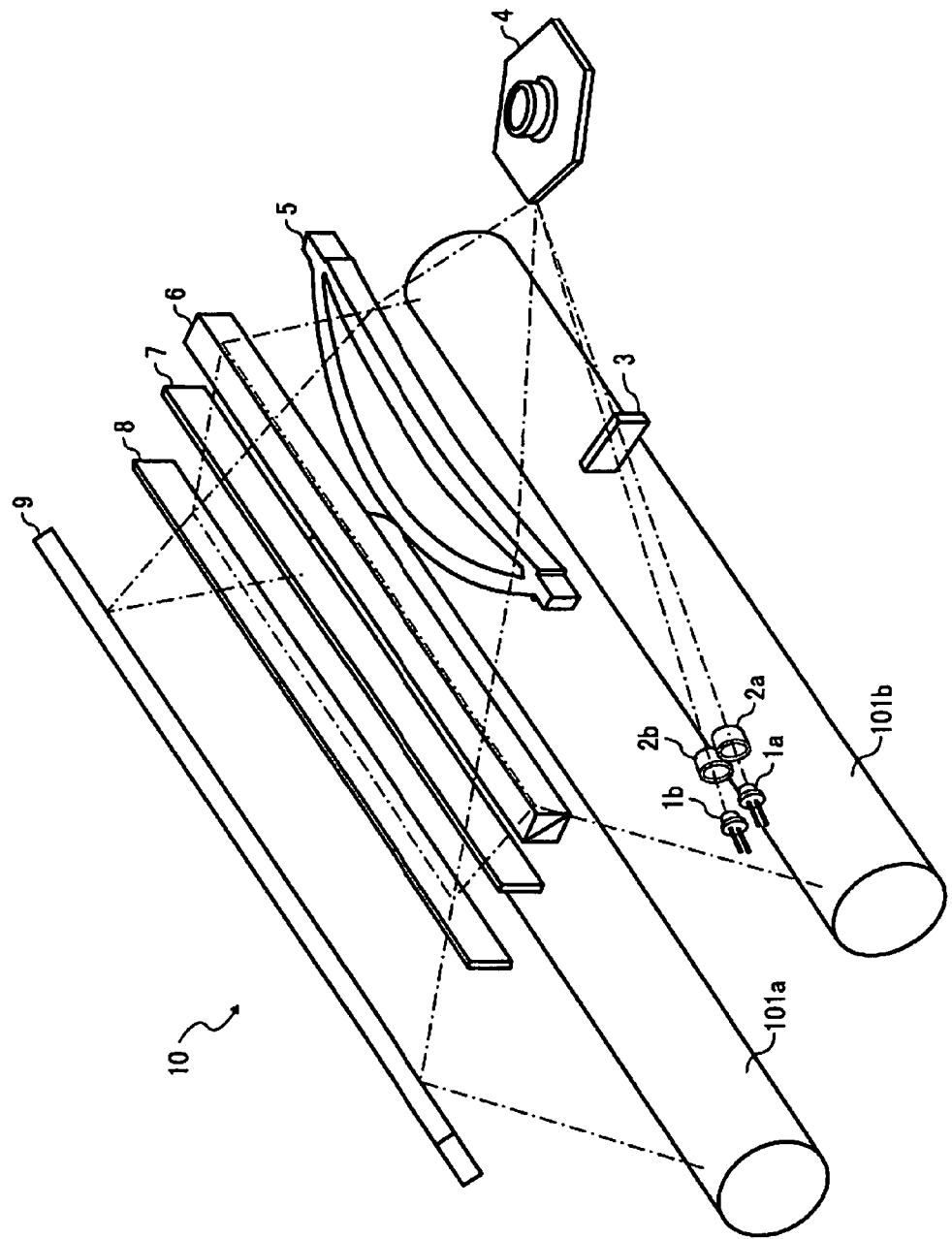
FIG. 1 is a perspective view of an optical writing device according to a first embodiment of the present invention.
Figure 2:
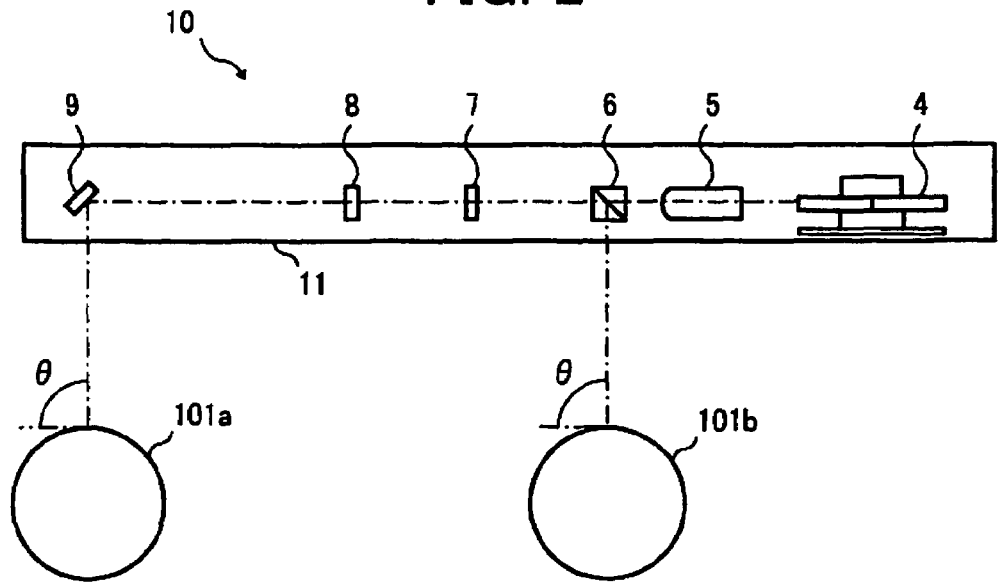
FIG. 2 is a side view of the optical writing device.

FIG. 1 is a perspective view and FIG. 2 is a side view of an optical writing device 10 according to a first embodiment of the present invention. The optical writing device 10 includes semiconductor lasers 1a and 1b as light sources, collimating lenses 2a and 2b, a cylindrical lens 3, a polygon mirror 4 that serves as a deflection unit, an fθ lens 5 that serves as a scanning lens, a deflection beam splitter 6 that serves as a first beam separation unit, a ¼ wavelength plate 7, a dichroic mirror 8 that serves as a second beam separation unit, and a reflecting mirror 9, all of which are accommodated in a housing 11. The semiconductor lasers 1a and 1b emit light beams of different wavelengths corresponding to the dichroic mirror 8.

Figure 3:
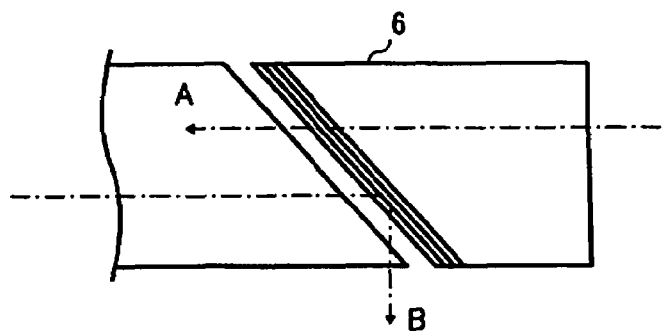
FIG. 3 is a schematic diagram for explaining splitting of light by a deflection beam splitter shown in FIG. 1.

The two light beams of different wavelengths emitted from the semiconductor lasers 1a and 1b pass through the collimating lenses 2a and 2b, and then pass through the cylindrical lens 3 to be focused on the polygon mirror 4 and have one identical optic axis in a sub scanning direction. The light beams are then reflected by the polygon mirror 4, and pass through the fθ lens 5 and the deflection beam splitter 6. As shown in FIG. 3, the deflection beam splitter 6 is configured such that a plurality of thin films of different refractive indices is provided to an optical element, and separates the light beams in accordance with the polarization direction caused by difference in π/2 rotation angle of the light beams. That is, as shown in FIG. 3, whether the deflection beam splitter 6 passes a light beam as indicated by an arrow A or reflects a light beam as indicated by an arrow B depends upon the direction from which a light beam is received.

The light beams of different wavelengths that have passed through the fθ lens 5 and the deflection beam splitter 6, then pass through the ¼ wavelength plate 7. The ¼ wavelength plate 7 rotates the polarization direction of a light beam by π/4. When the focused light beams pass through the ¼ wavelength plate 7, the polarization directions of the two light beams are rotated by π/4 from the angles at the time that the two light beams were emitted. The π/4-rotated light beams are separated by the dichroic mirror 8 into two light beams, a passing beam and a reflecting beam, because of the function of the dichroic mirror 8 to selectively pass or reflect the light beams depending on the wavelengths of the light beams. As shown in FIG. 2, the two light beams that are focused on the polygon mirror 4 travel the same light path to reach the dichroic mirror 8.

The passing beam is reflected by the reflecting mirror 9 and is radiated onto a scan target surface of a photosensitive element 101a. In contrast, the reflecting beam travels back to the light path and passes through the ¼ wavelength plate 7, so that the polarization direction of the light beam is further rotated by π/4. As a result, the reflected beam is rotated by π/2 from the angle at the time that the light beam was emitted. The π/2-rotated light beam is received and reflected by the deflection beam splitter 6 to be radiated onto a scan target surface of a photosensitive element 101b. In this manner, the light beams emitted from the semiconductor lasers 1a and 1b are directed to and radiated onto the photosensitive elements 101a and 101b, respectively.

A linearly-polarized P-wave is used, although not limited, for the two light beams emitted from the semiconductor lasers 1a and 1b. One of the light beams rotated by π/4 by the ¼ wavelength plate 7 to be converted into a circularly polarized light beam and then passes through the dichroic mirror 8 to be radiated onto the photosensitive element 101a. The other light beam is also rotated by π/4 by the ¼ wavelength plate 7 to be converted into a circularly polarized light beam, however, subsequently, this circularly polarized light beam is reflected by the dichroic mirror 8, re-passes the ¼ wavelength plate to be further rotated by π/4 to be converted into a linearly-polarized S-wave, and is radiated onto the photosensitive element 101b.

In the optical writing device 10, the optical components are arranged such that the length of the light path from the semiconductor lasers 1a and 1b to the photosensitive element 101a is substantially the same as the length of the light path from the semiconductor lasers 1a and 1b to the photosensitive element 101b. For this purpose, particularly the positional relation between the deflection beam splitter 6, the dichroic mirror 8, and the reflecting mirror 9 are adjusted. More particularly, the deflection beam splitter 6, the dichroic mirror 8, and the reflecting mirror 9 are adjusted such that the length of the light path from the deflection beam splitter 6 to the reflecting mirror 9 is substantially the same as the length of the light path from the deflection beam splitter 6 to the deflection beam splitter 6 via the dichroic mirror 8.

Furthermore, the incident angles "θ" of the light beams into the photosensitive elements 101a and 101b are substantially equal as shown in FIG. 2.

Moreover, the scanning plane of the polygon mirror 4 and a surface formed central axes of the photosensitive elements 101a and 101b are substantially parallel.

Figure 4:
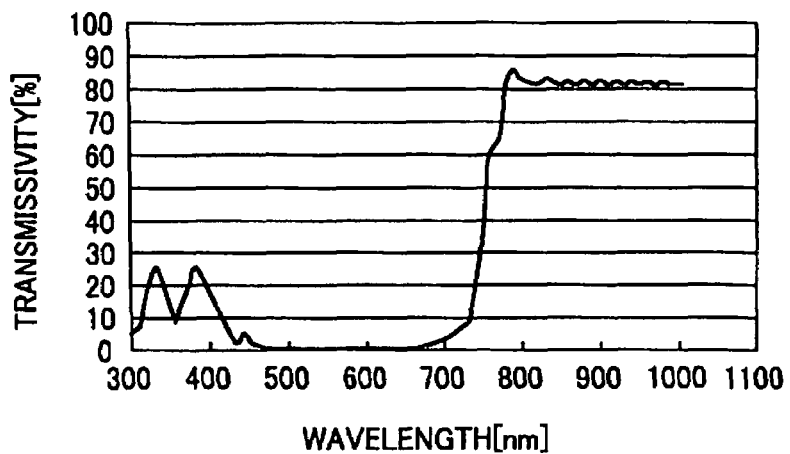
FIG. 4 is a graph illustrating a relation between wavelength and transmissivity of a heat ray transmission type dichroic mirror.
Figure 5:
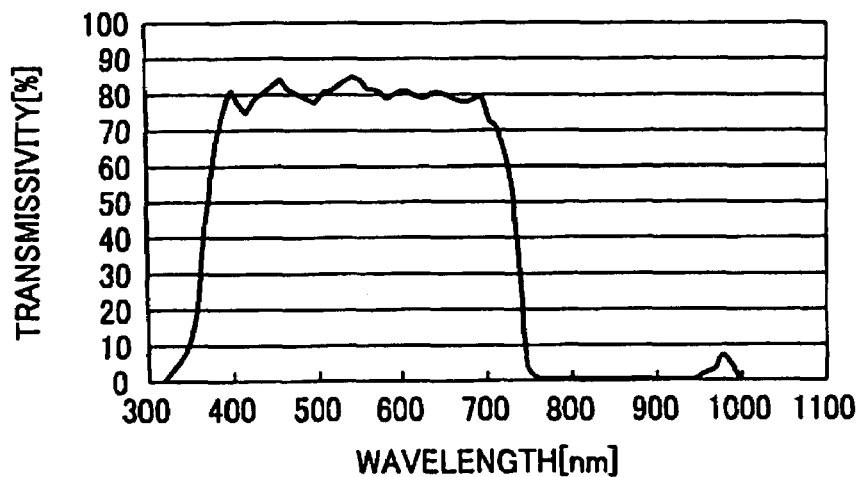
FIG. 5 is a graph illustrating a relation between wavelength and transmissivity of a heat ray reflection type dichroic mirror.

Separating two light beams by the dichroic mirror 8 as a dielectric multilayer mirror necessitates that the wavelengths between the two light beams are different. The boundary between reflection and transmission may vary depending on the multilayer film that has been used, however, a wavelength around 750 nanometers is shown as the boundary in FIGS. 4 and 5. Accordingly, a selection of wavelengths around 750 nanometers is required for the light beams when using the dichroic mirror having properties as exemplified in FIGS. 4 and 5. For example, a visible light of around 650-nanometer wavelength and an infrared light of around 800-nanometer wavelength can be used as the semiconductor lasers 1a and 1b.

A hot mirror (heat ray reflection type) or a cold mirror (heat ray transmission type) can be used as the dichroic mirror 8. The relation between wavelength and transmissivity of the heat ray transmission type dichroic mirror is graphed in FIG. 4, and the relation between wavelength and transmissivity of the heat ray reflection type dichroic mirror is graphed in FIG. 5.

Figure 6:
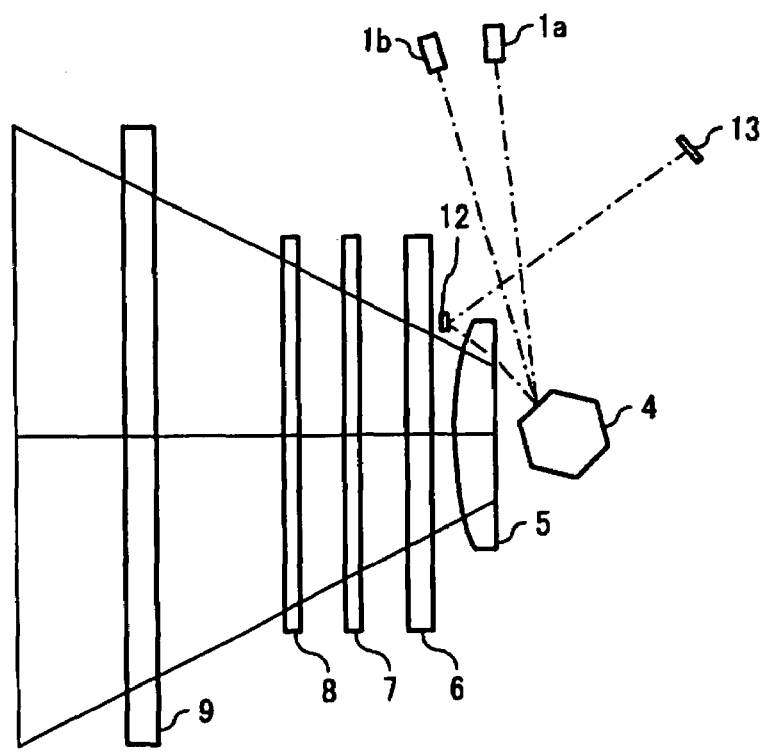
FIG. 6 is a plan view of the optical writing device for explaining synchronous detection.

FIG. 6 is a plan view of the optical writing device 10 for explaining synchronous detection. The light beams from the semiconductor lasers 1a and 1b are reflected by the polygon mirror 4, pass through the fθ lens 5, and are received by a synchronous detection element 13 via a mirror 12 (reflecting mirror) arranged out of the scanning range. Because the synchronous detection element 13 is in the position before the light beams enter into the deflection beam splitter 6, the single synchronous detection element 13 can perform the synchronous detection for the two light sources without using a beam focusing element. Furthermore, because the angles at which the semiconductor lasers 1*a* and 1*b* are arranged relative to the polygon mirror 4 differ from each other and the positions of the two light sources are shifted in a main scanning direction, the two light beams do not simultaneously enter into the synchronous detection element 13. Therefore, it is not needed to control emission timings of the semiconductor lasers 1*a* and 1*b* for the synchronous detection.

If a beam focusing element is used for focusing two light beams, it is required to control timings of emitting light beams to avoid simultaneous entering of two light beams.

According to the first embodiment, two light beams that are focused on one optic axis in the sub scanning direction are separated by the first beam separation unit and the second beam separation unit to be directed to the corresponding photosensitive elements without using any mirror. As a result, a thin optical writing device can be realized.

Figure 7:
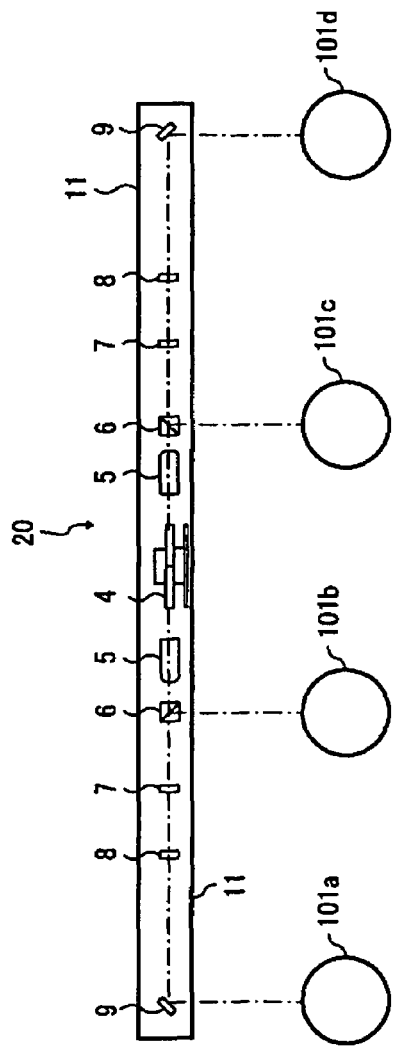
FIG. 7 is a side view of an optical writing device according to a second embodiment of the present invention.

FIG. 7 is a side view of an optical writing device 20 according to a second embodiment of the present invention. The optical writing device 20 is compatible with a four-color image forming apparatus. In the optical writing device 20, two sets of semiconductor lasers (not shown), collimating lenses (not shown), cylindrical lens (not shown), the fθ lens 5, the deflection beam splitter 6, the ¼ wavelength plate 7, the dichroic mirror 8, and the reflecting mirror 9 are arranged substantially mirror-symmetrically with respect to the polygon mirror 4. In other words, the optical writing device 20 includes semiconductor lasers 1*c* and 1*d* (not shown) in addition to the semiconductor lasers 1*a* and 1*b* (not shown). The light beams from the semiconductor lasers 1*a* and 1*b* are directed onto the photosensitive elements 101*a* and 101*b*, and the light beams from the semiconductor lasers 1*c* and 1*d* are directed onto photosensitive elements 101*c* and 101*d*. The method of directing light beams to respective photosensitive elements through separation and the like is the same as that in the first embodiment, so that the explanation is omitted.

The optical writing device 20 can be used in a tandem color image forming apparatus. The thickness of the optical writing device 20 is not increased compared to that of the optical writing device 10. Therefore, downsizing of the color image forming apparatus, particularly in an up-down direction can be realized.

Figure 8:
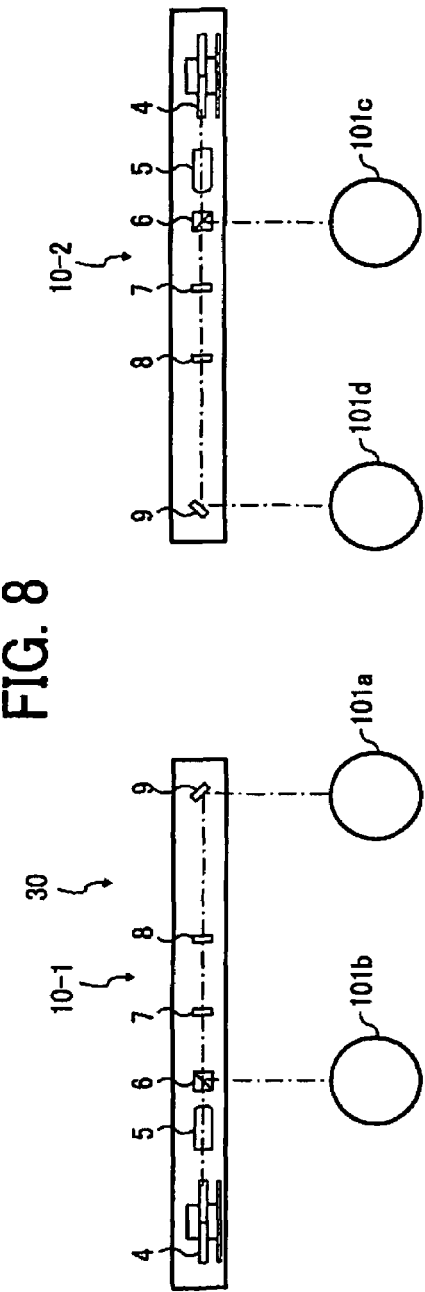
FIG. 8 is a side view of an optical writing device according to a third embodiment of the present invention.

FIG. 8 is a side view of an optical writing device 30 according to a third embodiment of the present invention. The optical writing device 30 includes two optical writing devices 10-1 and 10-2 compatible with a four-color image forming apparatus. Each of the optical writing devices 10-1 and 10-2 has the same configuration as the optical writing device 10 in the first embodiment. The two light beams from the optical writing device 10-1 on the left side of FIG. 8 are directed onto the photosensitive elements 101*a* and 101*b*, and the light beams from the optical writing device 10-2 on the right side of FIG. 8 are directed onto the photosensitive elements 101*c* and 101*d*. The optical writing devices 10-1 and 10-2 are arranged on the same plane. Each of the optical writing devices 10-1 and 10-2 has the polygon mirror on an outer end and functions in the same manner as the optical writing device 10 in the first embodiment.

Figure 9:
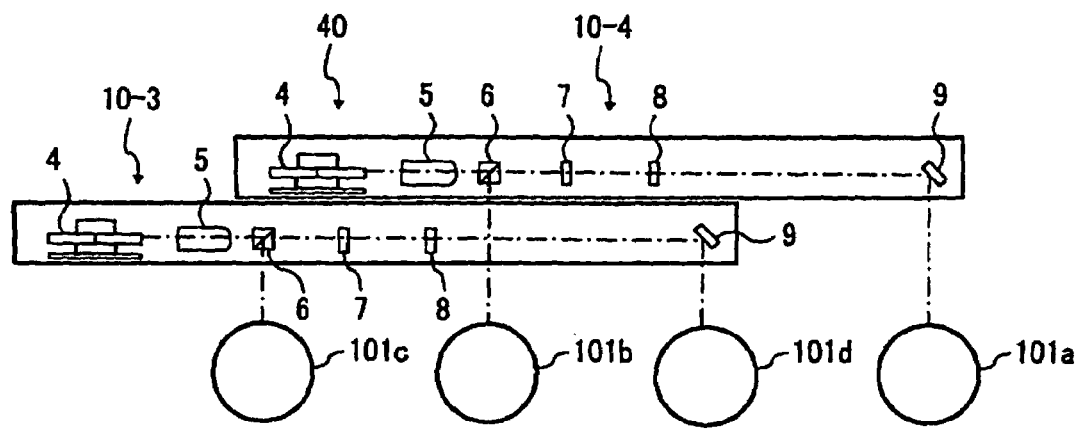
FIG. 9 is a side view of an optical writing device according to a forth embodiment of the present invention.

FIG. 9 is side view of an optical writing device 40 according to a fourth embodiment of the present invention. The optical writing device 40 includes two optical writing devices 10-3 and 10-4 compatible with a four-color image forming apparatus. Each of the optical writing devices 10-3 and 10-4 has the same configuration as the optical writing device 10 in the first embodiment. The optical writing devices 10-3 and 10-4 are arranged in an overlapping manner. The two light beams from the optical writing device 10-4 are directed onto the photosensitive elements 101*a* and 101*b*, the two light beams from the lower optical writing device 10-3 are directed onto the photosensitive elements 101*c* and 101*d*. The method of directing light beams to respective photosensitive elements through separation and the like is the same as that in the first embodiment, so that the explanation is omitted.

Figure 10:
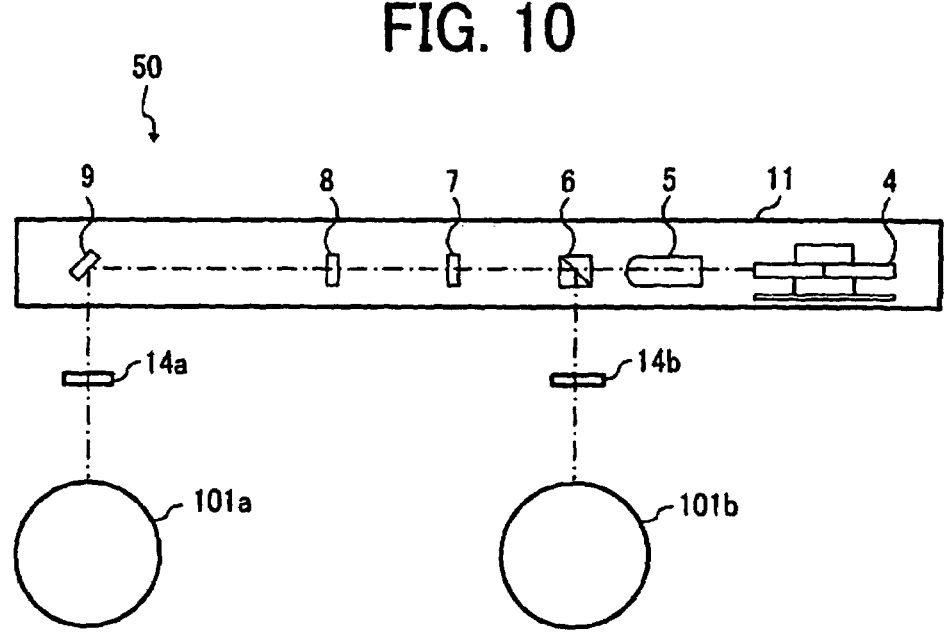
FIG. 10 is a side view of an optical writing device according to a fifth embodiment of the present invention.

FIG. 10 is a side view of an optical writing device 50 according to a fifth embodiment of the present invention. Because the light beams can not be separated 100% by the dichroic mirror 8, a small percentage of inseparable light beams may be radiated onto an unintended photosensitive element. To address this issue, in the optical writing device 50, an optical filter 14*a* is arranged on the upstream side of the photosensitive element 101*a* and on the downstream side of the dichroic mirror 8, and another optical filter 14*b* is arranged on the upstream side of the photosensitive element 101*b* and on the downstream side of the dichroic mirror 8. Because the optical filters 14*a* and 14*b* pass light beams of a specific wavelength range, the light beams that cannot be separated by the dichroic mirror 8 can be blocked. The optical filters 14*a* and 14*b* can be used in all the other embodiments.

Figure 11:
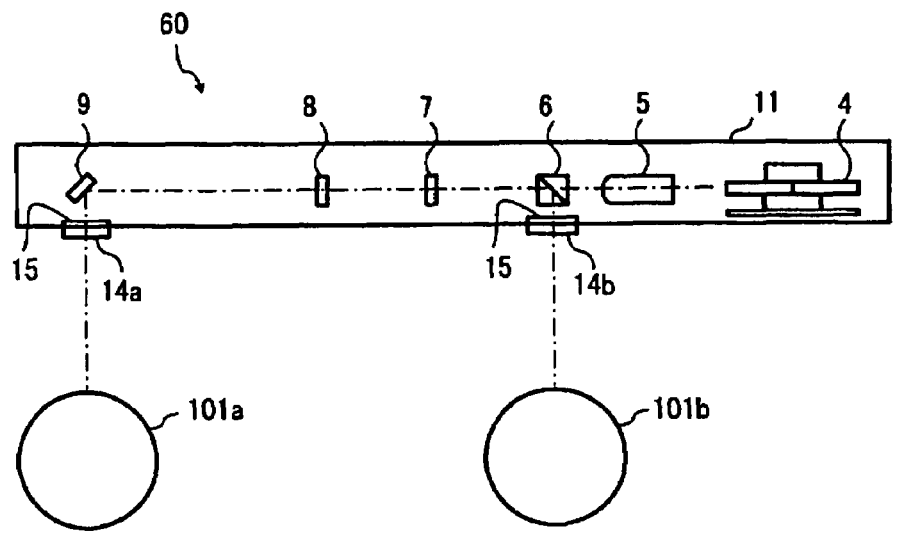
FIG. 11 is a side view of an optical writing device according to a sixth embodiment of the present invention.

FIG. 11 is a side view of an optical writing device 60 according to a sixth embodiment of the present invention. In the optical writing device 60, the optical filters 14*a* and 14*b* are integrally provided with a dustproof glass 15. This structure can be used in all the other embodiments. The dustproof glass 15 is embedded in a beam emission aperture of the housing 11 and prevents dust and floating toner from entering into the housing 11.

Figure 12:
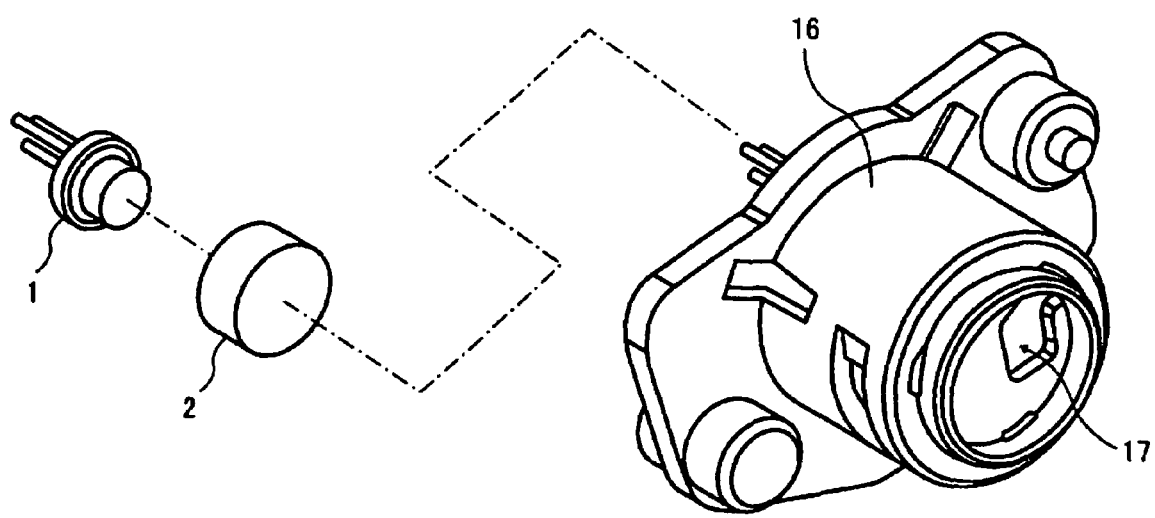
FIG. 12 is a perspective view of a lens holder that holds a laser diode and a collimating lens.

As in the above embodiments, because the two light beams to be separated have different wavelengths and the two light paths (distances to the scan targets) are equal, the light beam diameters on the scan targets differ from each other. The light beam diameters can be the same on the scan targets by providing an aperture on the downstream side of each of the collimating lenses 2*a* and 2*b* and adjusting the shape of each aperture to correspond to the wavelength of each light beam. That is, the aperture shapes can be changed to fit each wavelength. As shown in FIG. 12, in a practical use, a laser diode 1 and a collimating lens 2 are housed in a lens holder 16 such that the light beam emitted from the laser diode 1 passes through the collimating lens 2 and the beam diameter of the light beam is adjusted by an aperture 17.

Figure 13:
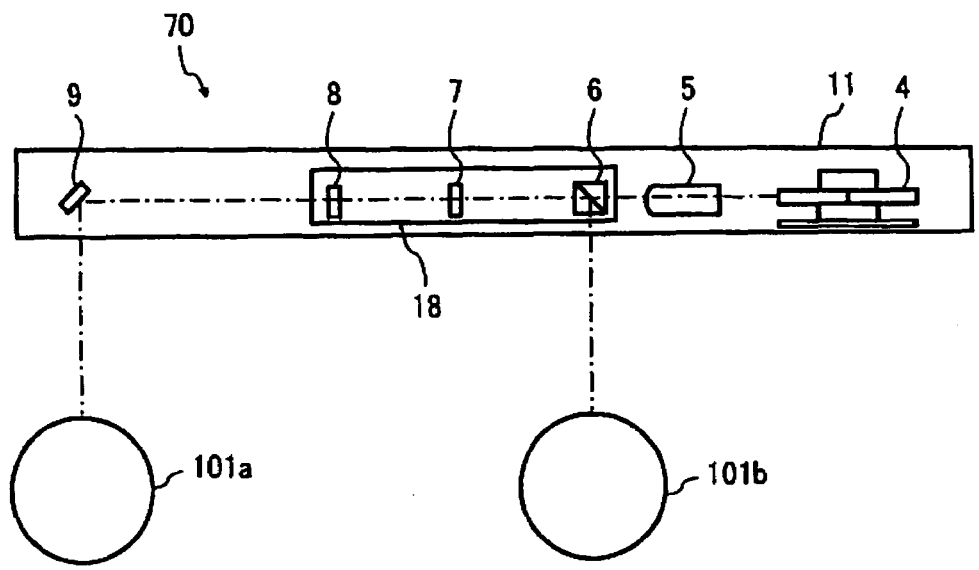
FIG. 13 is a side view of an optical writing device according to a seventh embodiment of the present invention.

FIG. 13 is a side view of an optical writing device 70 according to a seventh embodiment of the present invention. In the optical writing device 70, the deflection beam splitter 6 and the dichroic mirror 8 be attached to and supported by a single support member 18. The ¼ wavelength plate 7 is also supported with the support member 18. If the two beam separation units are supported by different support members, the dimensional tolerance may be accumulated in the support members, resulting in a positional shift. On the other hand, when the deflection beam splitter 6 and the dichroic mirror 8 are supported by the same support member 18, the dimension between the two optical elements can be maintained as appropriate.

Figure 14:
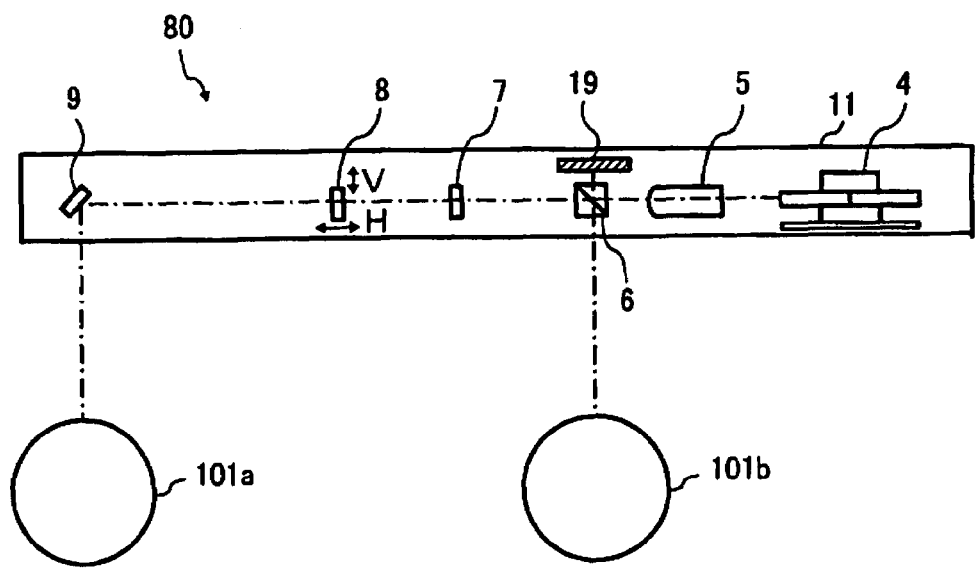
FIG. 14 is a side view of an optical writing device according to an eighth embodiment of the present invention.

FIG. 14 is a side view of an optical writing device 80 according to an eighth embodiment of the present invention. In the optical writing device 80, an optical diffusion member 19 supplements the function of the deflection beam splitter 6. Specifically, it is desired that the two light beams that have passed through the fθ lens 5 effectively pass through the deflection beam splitter 6. However, the light beams do not always enter the deflection beam splitter 6 in a state of being deflected to be perfectly parallel or perpendicular to the deflection beam splitter 6 due to the variations in the light emission states from the light source or in the light sources. The deviated light beam is separated by the deflection beam splitter 6 and is radiated into a direction opposite to the photosensitive element 101b (indicated in a dashed line in FIG. 14). Then, the oppositely-directed light beam is reflected and reversely travels the light path, thereby causing a flare. Therefore, the optical diffusion member 19 that diffuses, or attenuates, the light beams is provided, so that reflections of the deviated light beams can be avoided. As a result, the light beams can appropriately travel to the photosensitive element 101b. The optical diffusion member 19 can be placed in the embodiments shown in FIGS. 7 to 11.

The lengths of the light paths may vary for the plurality of photosensitive elements 101a and 101b depending on the variations in the light sources and the optical elements. However, the dichroic mirror 8 is provided to be movable in the optic axis direction as indicated by the arrow H in FIG. 14. Therefore, the light lengths can be equal by adjusting the position of the dichroic mirror 8 in the optic axis direction.

If a multilayer dielectric mirror is used as the dichroic mirror 8, then the reflection position may vary depending on the state of the thin films (multilayered thin film layer). However, because the dichroic mirror 8 is held movable in a direction perpendicular to the optic axis as indicated by the arrow V in FIG. 14, the light beam reflected by the dichroic mirror 8 can be radiated onto the photosensitive element 101b appropriately by adjusting the position of the dichroic mirror 8 in the direction perpendicular to the optic axis. Moreover, the position of the reflecting mirror 9 can be adjusted in the direction indicated by the arrow V along with the position adjustment of the dichroic mirror 8 in the direction indicated by the arrow V, whereby the light beam that has passed through the dichroic mirror 8 can be appropriately radiated onto the photosensitive element 101a.

The configuration of the optical writing device 80 can be applied to all other embodiments.

Figure 15:
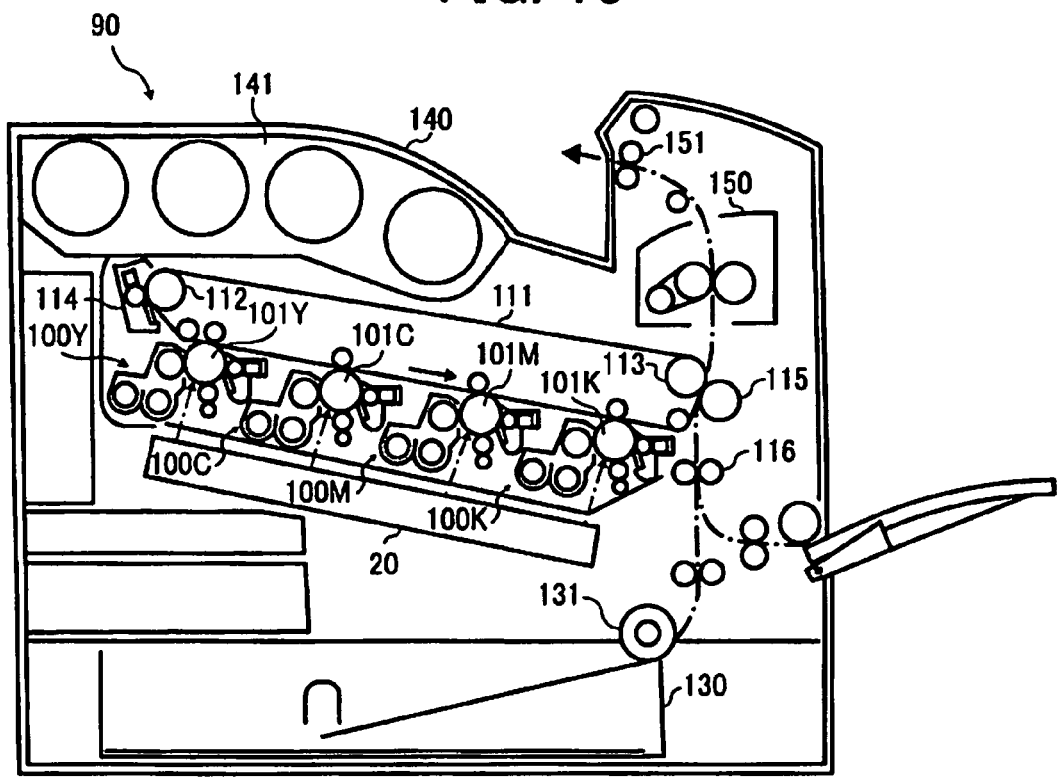
FIG. 15 is a side view of an image forming apparatus according to a ninth embodiment of the present invention.
Figure 16:
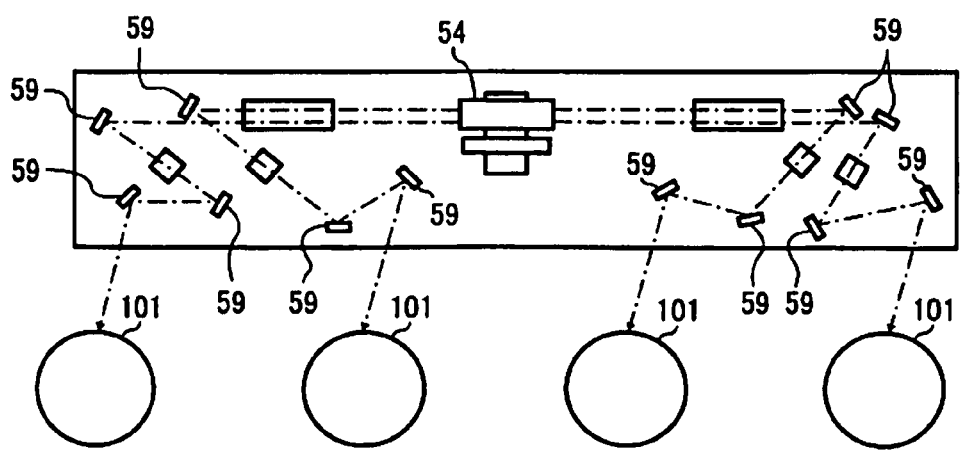
FIG. 16 is a schematic diagram of a conventional optical writing device.

FIG. 15 is a side view of an image forming apparatus 90 according to a ninth embodiment of the present invention. The image forming apparatus 90 includes the optical writing device 20 according to the second embodiment. However, the image forming apparatus 90 can include, instead of the optical writing device 20, the optical writing device 10, 30, 40, 50, 60, or 70.

The image forming apparatus 90 is, although not limited, a tandem-type full-color printer and includes image forming units 100Y, 100C, 100M, and 100K for yellow, cyan, magenta, and black. The image forming units 100Y, 100C, 100M, and 100K are arranged in a line along and under an intermediate transfer belt 111, and positioned substantially in the center of the image forming apparatus. The intermediate transfer belt 111 is supported with support rollers 112 and 113 and is driven to rotate in the counterclock direction in FIG. 15. A cleaning unit 114 to clean the intermediate transfer belt 111 is placed on the outer left side of the support roller 112.

The image forming units 100Y, 100C, 100M, and 100K have the same configuration and contain different colors. The image forming units 100Y, 100C, 100M, and 100K include photosensitive elements 101Y, 101C, 101M, and 101K as image carriers, respectively. A charging unit, a developing unit, and a cleaning unit are provided around each of the photosensitive elements 101Y, 101C, 101M, and 101K. Moreover, a primary transfer roller is placed opposed to each of the photosensitive elements 101Y, 101C, 101M, and 101K in the loop of the intermediate transfer belt 111.

The optical writing device 20 is provided under the image forming units 100Y, 100C, 100M, and 100K. The optical writing device 20 is compatible with a four-color image forming apparatus and emits the light beams modulated based on the image data to be radiated onto the surfaces of the photosensitive elements 101Y, 101C, 101M, and 101K. The optical writing devices 10-1 and 10-2 in FIGS. 8 and 9 can be used for the color image forming apparatus. The layouts of the photosensitive elements 101a, 101b, 101c, and 101d as arranged under the optical writing devices 10, 10-1, 10-2, 10-3, 10-4, and 20 are explained in the embodiments. However, in the color printer shown in FIG. 15, the photosensitive elements 101 are placed above the optical writing device 20, so that the optical scanning beams are emitted upward.

A toner accommodating unit 141 that includes toner bottles for accommodating toner in four colors of yellow, cyan, magenta, and black is placed above the intermediate transfer belt 111. The toner of each color is supplied from each toner bottle to each developing unit of the image forming units 100Y, 100C, 100M, and 100K by a toner supply mechanism (not shown).

A feed tray 130 that accommodates a stack of sheets and a feed device 131 that feeds the sheets are provided in the bottom of the image forming apparatus. A sheet sorting mechanism and the like are not shown in detail in FIG. 15.

A secondary transfer roller 115 is provided opposed to the support roller 113. A pair of registration rollers 116 is provided near and under the secondary transfer roller 115, and a fixing unit 150 is provided above the secondary transfer roller 115.

The operation of the image forming apparatus 90 is briefly explained below. The photosensitive elements 101Y, 101C, 101M, and 101K are driven to rotate clockwise by a driving unit (not shown), so that the surfaces of the photosensitive elements 101Y, 101C, 101M, and 101K are uniformly charged to a predetermined polarity with the charging units. The charged surfaces of the photosensitive elements 101Y, 101C, 101M, and 101K are radiated with the light beams from the optical writing device 20, whereby latent images are formed thereon. Each latent image is formed based on image data for a corresponding color obtained by separating full-color image data for a desired full-color image. The toner of each color is supplied from the developing unit onto the corresponding latent image to be developed into a toner image.

The intermediate transfer belt 111 is driven to rotate in the counterclock direction, so that the toner images are transferred from each of the photosensitive elements 101Y, 101C, 101M, and 101K onto the intermediate transfer belt 111 at the image forming units 100Y, 100C, 100M, and 100K in a superimposing manner by the action of the primary transfer rollers. Consequently, a full-color toner image is carried on the intermediate transfer belt 111.

When forming a unicolor image, one of the image forming units 100Y, 100C, 100M, and 100K, i.e., the image forming unit 100K on the far right shown in FIG. 15 can be used. In the similar manner, two-color and three-color images can be formed.

The toner remaining on each surface of the photosensitive elements 101Y, 101C, 101M, and 101K after the toner images have been transferred is removed by the cleaning unit 114, and then the surface potentials are initialized by a neutralizing unit to prepare for the next image formation.

A sheet is fed from the feed tray 130, and is conveyed toward the secondary transfer position in synchronization with the full-color toner image on the intermediate transfer belt 111. A predetermined voltage is applied to the secondary transfer roller 115, whereby the full-color toner image on the surface of the intermediate transfer belt 111 is collectively transferred onto the sheet. The full-color toner image is melted and fixed onto the sheet with heat and pressure applied by the fixing unit 150. The sheet on which the full-color toner image is fixed is discharged by a pair of discharge rollers 151 onto a sheet catch tray 140.

As explained above, the optical writing device 20 is small-sized and thin, which therefore can be arranged in a small space within an image forming apparatus. Therefore, downsizing of a color image forming apparatus can be attained.

The embodiments are explained with reference to the accompanying drawings, however, the present invention is not limited thereto. For example, a beam separation unit capable of separating a plurality of light beams can be appropriately used for a combination of the light sources and the second beam separation unit. Different configurations can be applied to the first beam separation unit. Furthermore, the incident angle of a light beam into the scan target can be changed appropriately. The scan target is not limited to the drum type, and it can be a belt type.

The present invention can be applied not only to the image forming apparatus of the intermediate transfer type but can be applied to a direct transfer type. Furthermore, the image forming apparatus is not limited to the four-color type and it can be multicolor type, such as two-color type. Moreover, the configurations of the components of the image forming apparatus are selectable. The image forming apparatus is not limited to a copier, and it can be a printer, a facsimile, and a multifunction machine.

According to one aspect of the present invention, a dimension of the optical writing device can be reduced.

According to another aspect of the present invention, the light beam that has been separated by the second beam separation unit is reflected to be directed onto the scan target.

According to still another aspect of the present invention, the light beams of different wavelengths can be appropriately separated.

According to still another aspect of the present invention, the space for positioning the optical writing device can be reduced.

According to still another aspect of the present invention, complex positioning of the scan targets is not required, so that downsizing of the image forming apparatus can be attained.

According to still another aspect of the present invention, the inseparable light beams by the second beam separation unit can be blocked, so that the appropriate light beams can be radiated onto the scan target.

According to still another aspect of the present invention, the configuration of the optical write unit is simple, so that the cost can be reduced.

According to still another aspect of the present invention, an assembly work, an adjustment work, and failure analysis can be facilitated.

According to still another aspect of the present invention, the light paths to the scan targets can be adjusted to be equal in accordance with variation in light sources and optical elements, so that appropriate light beams can be radiated onto the scan targets.

According to still another aspect of the present invention, it is possible to cope with the different reflecting positions, which may occur depending upon the state of the second beam separation unit, so that appropriate light beams can be radiated onto the scan targets.

According to still another aspect of the present invention, the flare that causes an abnormal image can be prevented, so that appropriate light beams can be radiated onto the scan targets.

According to still another aspect of the present invention, the positional relation between the first and second beam separation units can be maintained accurately.

According to still another aspect of the present invention, the diameters of the light beams can be equal on the scan targets.

According to still another aspect of the present invention, a single synchronous detection element can perform a synchronous detection for a plurality of light sources without using a beam focusing element. Furthermore, timing controlling of emitting lights from light sources is not required, so that the control can be easy.

According to still another aspect of the present invention, the number of components for the optical writing device is minimized even for color image scanning.

According to still another aspect of the present invention, the optical writing device is applicable to color image scanning, and the projection range by light beams can be narrow, so that an interval between the scan targets can be small. Therefore, an image forming apparatus can be downsized.

According to still another aspect of the present invention, because the image forming apparatus includes the thin type optical writing device, the up-down size of the image forming apparatus can be reduced. As a result, the image forming apparatus can be downsized.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical writing device that scans a plurality of scan target surfaces with a plurality of light beams, the optical writing device comprising:
   a plurality of light sources that emits light beams of different wavelengths;
   an optical element that focuses the light beams into focused light beams to have one optic axis in a sub scanning direction;
   a deflector that deflects the focused light beams to obtain deflected light beams;
   a first beam separation unit that passes therethrough or reflects a light beam depending on a direction from which the light beam is received, wherein the first beam separation unit passes the deflected light beams as passing beams; and
   a second beam separation unit that passes therethrough or reflects a light beam depending upon a wavelength of the light beam, wherein the second beam separation unit separates the passing beams into a first passing beam that passes through the second beam separation unit and a first reflecting beam that is reflected from the second beam separation unit, wherein
   the first reflecting beam is directed toward the first beam separation unit where the first reflecting beam is reflected as a reflecting beam,
   a first one of the scan target surfaces is scanned with the reflecting beam, and
   a second one of the scan target surfaces is scanned with the first passing beam.

2. The optical writing device according to claim 1, wherein the passing beam travels to the second beam separation unit along a light path, and the first reflecting beam travels to the first beam separation unit along the light path.

3. The optical writing device according to claim 1, wherein the first beam separation unit includes a deflection beam splitter, and the optical writing device includes a ¼ wavelength plate arranged between the first beam separation unit and the second beam separation unit.

4. The optical writing device according to claim 1, wherein the second beam separation unit includes a dichroic mirror.

5. The optical writing device according to claim 1, wherein the second beam separation unit is located such that light paths from the light sources to the scan target surfaces are substantially equal.

6. The optical writing device according to claim 1, wherein incident angles of the light beams into the scan target surfaces are substantially equal.

7. The optical writing device according to claim 1, wherein a scanning plane of the deflector and a surface formed by connecting incident positions of the light beams into the scan target surfaces are in parallel.

8. The optical writing device according to claim 1, further comprising an optical element that only passes a light beam of a specific wavelength range and is located on an upstream side of the scan target surfaces.

9. The optical writing device according to claim 8, further comprising a dustproof glass that prevents foreign matter from entering into the optical writing device, wherein the optical element is integrally provided with the dustproof glass.

10. The optical writing device according to claim 1, wherein one of the light beams emitted from the light sources is a visible light.

11. The optical writing device according to claim 1, wherein a position of the second beam separation unit is adjustable in the optic axis direction.

12. The optical writing device according to claim 1, wherein a position of the second beam separation unit is adjustable in a direction perpendicular to the optic axis direction.

13. The optical writing device according to claim 1, further comprising an optical diffusion member that diffuses or attenuates light beams and is arranged near the first beam separation unit on an opposite side of the scan target surface.

14. The optical writing device according to claim 1, further comprising a support member that supports at least two members including the first beam separation unit and the second beam separation unit.

15. The optical writing device according to claim 1, further comprising an aperture unit on the light paths of the light beams from the light sources to correspond to the wavelength of each of the light beams, wherein the aperture unit shapes diameters of the light beams to be equal on the scan target surfaces.

16. The optical writing device according to claim 1, further comprising a light beam detection unit that performs synchronous detection of the light beams from the light sources and is located so that a light that has been deflected by the deflector enters thereto before entering into the first beam separation unit.

17. The optical writing device according to claim 1, wherein the plurality of the scan target surfaces includes four scan target surfaces, the plurality of the light sources includes four light sources, the first beam separation unit includes two first beam separation units, the second beam separation unit includes two second beam separation units, each of the two first beam separation units and the two second beam separation units are arranged substantially mirror-symmetrically with respect to the deflector, and the four scan target surfaces are scanned by the light beams emitted from the four light sources.

18. The optical writing device according to claim 1, further comprising another optical writing device that has a same configuration and is arranged on a same plane, wherein the plurality of the scan target surfaces includes four scan target surfaces, the plurality of the light sources includes four light sources, the deflector of each of the optical writing devices is arranged on an outer end, and the four scan target surfaces are scanned by the light beams emitted from the four light sources.

19. The optical writing device according to claim 1, further comprising another optical writing device that has a same configuration and is arranged above the optical writing device, wherein the plurality of the scan target surfaces includes four scan target surfaces, the plurality of the light sources includes four light sources, and the four scan target surfaces are scanned by the light beams emitted from the four light sources.

20. An image forming apparatus comprising an optical writing device that scans a plurality of scan target surfaces with a plurality of light beams, the optical writing device including a plurality of light sources that emits light beams of different wavelengths;

an optical element that focuses the light beams into focused light beams to have one optic axis in a sub scanning direction;

a deflector that deflects the focused light beams to obtain deflected light beams;

a first beam separation unit that passes therethrough or reflects a light beam depending on a direction from which the light beam is received, wherein the first beam separation unit passes the deflected light beams as passing beams; and a second beam separation unit that passes therethrough or reflects a light beam depending upon a wavelength of the light beam, wherein the second beam separation unit separates the passing beams into a first passing beam that passes through the second beam separation unit and a first reflecting beam that is reflected from the second beam separation unit, wherein the first reflecting beam is directed toward the first beam separation unit where the first reflecting beam is reflected as a reflecting beam, a first one of the scan target surfaces is scanned with the reflecting beam, and a second one of the scan target surfaces is scanned with the first passing beam.

* * * * *